US007692331B2

(12) United States Patent
Langlois et al.

(10) Patent No.: US 7,692,331 B2

(45) Date of Patent: Apr. 6, 2010

(54) ELECTRICAL EMERGENCY SOURCE DEVICE LOCATED ON AN AIRCRAFT

(75) Inventors: Olivier Langlois, Colomiers (FR); Xavier Roboam, Toulouse (FR); Hubert Piquet, Toulouse (FR)

(73) Assignees: Airbus France, Toulouse (FR); Centre National de la Recherche Scientifique, Paris (FR); Institut Nartional Polytechnique de Toulouse, Toulouse (FR)

( * ) Notice: Subject to any disclaimer, the term of this patent is extended or adjusted under 35 U.S.C. 154(b) by 341 days.

(21) Appl. No.: 11/404,077

(22) Filed: Apr. 14, 2006

(65) Prior Publication Data

US 2009/0121546 A1 May 14, 2009

(30) Foreign Application Priority Data

Apr. 21, 2005 (FR) .................................. 05 51026

(51) Int. Cl.
*H02J 3/00* (2006.01)
*H02J 1/10* (2006.01)

(52) U.S. Cl. ........................................................ 307/59

(58) Field of Classification Search .................... 307/59
See application file for complete search history.

(56) References Cited

U.S. PATENT DOCUMENTS

| | | | | |
|---|---|---|---|---|
| 5,145,324 | A * | 9/1992 | Dickes et al. | 417/222.1 |
| 5,899,411 | A | 5/1999 | Latos et al. | |
| 5,917,251 | A | 6/1999 | Schermann et al. | |
| 6,838,923 | B2 * | 1/2005 | Pearson | 327/309 |
| 7,091,625 | B2 * | 8/2006 | Okusawa et al. | 290/1 R |
| 2004/0167732 | A1 * | 8/2004 | Spitaels et al. | 702/62 |
| 2004/0212194 | A1 | 10/2004 | Okusawa et al. | |
| 2004/0238688 | A1 * | 12/2004 | Audren | 244/75 R |
| 2006/0061922 | A1 * | 3/2006 | Mihai et al. | 361/20 |

OTHER PUBLICATIONS

Laurent Bertoni, et al., "Hybrid Auxiliary Power Unit (APU) for Automotive Applications", VTC 2002-Fall. 2002 IEEE 56TH, Vehicular Technology Conference Porceedings, XP-010608748, vol. 1 of 4. conf. 56, Sep. 24-28, 2002, pp 1840-1845.
Patent Abstracts of Japan, JP 2000-350380, Dec. 15, 2000.
Mike Koerner, "Recent Developments in Aircraft Emergency Power", Energy Conversion Engineering Conference and Exhibit, 2000, XP-010512633, vol. 1, Jul. 24, 2000, pp. 12-19.

* cited by examiner

*Primary Examiner*—Fritz M Fleming
*Assistant Examiner*—Dru M Parries
(74) *Attorney, Agent, or Firm*—Oblon, Spicak, McClelland, Maier & Neustadt, L.L.P.

(57) ABSTRACT

The invention relates to an electrical emergency source device fitted on an aircraft, which comprises an energy source capable of outputting the power necessary for vital electrical loads (10) to operate correctly, wherein there are two types of these loads:

first loads, that absorb a constant power with time,
second loads, that absorb variable power with time.

Wherein this device comprises:

a power source (12) sized to output the average power absorbed by all loads,
a power source (15) capable of supplying power peaks absorbed by the second loads, and wherein, since the power of several loads is reversible, the power of the said device is also reversible.

15 Claims, 1 Drawing Sheet

ELECTRICAL EMERGENCY SOURCE DEVICE LOCATED ON AN AIRCRAFT

TECHNICAL DOMAIN

The invention relates to a electrical emergency source device on an aircraft.

STATE OF PRIOR ART

An airplane will be considered in the remainder of this description, as an example.

An emergency power supply source frequently used on a <<more electric aircraft>> like an Airbus A380 is a <<Ram Air Turbine>> (RAT) driving an electrical generator through a speed multiplier.

In emergency situations on board an aircraft, such a ram air turbine can be used to generate sufficient power to allow this aircraft to fly for a sufficiently long time and then to land.

A ram air turbine comprises a propeller activated by high-speed air circulating in contact with the aircraft. The propeller that thus turns drives a turbine that outputs the emergency power necessary to enable critical systems of the aircraft, for example flight controls and key avionics circuits, to continue operating. During normal flight, the assembly is folded and stored in the fuselage or in the wing of the aircraft.

As shown in FIG. 1, the various vital electrical loads 10 are directly connected to the generator 11 of the ram air turbine 12 that comprises a propeller 13. In this configuration, the ram air turbine 12 outputs all power necessary for the electrical loads 10 to operate correctly. Therefore it must be sized according to the <<worst case>> (design case) of all consuming systems.

An <<Auxiliary Power Unit>> can also be used as an emergency electrical source. Such a unit runs on kerosene and can be used firstly to generate air and secondly electricity. It is usually used on the ground in airports before the engines are started. But such a unit has the following disadvantages:

- The performances of such a unit are limited at high altitude. In particular, starting at high altitude is difficult and long. This disadvantage can be overcome by making such a unit operate continuously from the airport, but this leads to a waste of kerosene.
- If such a unit is used under normal operating conditions of the aircraft and if it is required to use it as an emergency source, segregation problems can arise between the normal electrical network and the emergency electrical network. An independent emergency source provides a means of respecting segregation rules.
- The primary energy source for such a unit is kerosene. Therefore a leak in a fuel tank makes it impossible to use this unit for emergency power supply.

There are two types of loads in an aircraft to which emergency power has to be supplied:

- loads that absorb an almost constant power with time (computers, etc.),
- fluctuating loads that absorb variable power with time (mainly electrically powered flight control actuators).

Fluctuating loads represent an important part of the emergency power consumed. They generate power peaks approximately equal to the value of the power of constant loads, namely a maximum intermittent rate of 50%.

Devices acting as emergency electrical power supplies according to prior art are thus oversized with respect to the average power required by the loads.

The purpose of the invention is to overcome this type of disadvantage by making it possible to size the emergency generating device precisely to satisfy needs and thus reduce its size.

PRESENTATION OF THE INVENTION

The invention relates to an emergency electricity generating source device located on an aircraft, that includes an energy source capable of outputting the power necessary for vital electrical loads to operate correctly, wherein there are two types of these loads:

- first loads, that absorb a constant power with time,
- second loads, that absorb variable power with time, wherein this device comprises:

- a power source sized to output the average power absorbed by all loads,
- a power source capable of supplying power peaks absorbed by the second loads, and wherein, since the power of several loads are reversible, the power of the said device is also reversible.

Advantageously, the aircraft onboard network is a DC high voltage network.

The energy source may be a ram air turbine (RAT), an auxiliary power unit (APU), or a fuel cell.

The power source may be a storage element that comprises accumulator batteries and/or supercapacitors and/or a flywheel.

In one advantageous embodiment, the energy source may be a ram air turbine that imposes its voltage on the onboard network. In one variant, the storage element can impose its voltage on the onboard network.

The aircraft may be an airplane.

The device according to the invention has the following advantages:

- The association of a power source and an energy source provides a means of combining the main benefits of each, the advantage being undersizing of the main energy source.
- The energy of the assembly is managed by harmonic filtering which is highly efficient, leads to easy control and enables the storage means to be kept charged, which is how the power source is kept available.
- In the case of a ram air turbine, a strategy for optimising ram air energy makes it possible to size the turbine precisely. This is possible because the properties of sources can be reversed; the network voltage is then imposed by the power source, and the current is imposed by the energy source.
- Due to the storage means, energy can be recovered by the flight control actuators during generator operating phases, particularly in the case of a DC network. Heat dissipation in electrical actuators can thus be reduced. The power of these actuators can be reversed, particularly for the supply of energy from these reversible loads to the power source (battery, capacitor, etc.). They usually need electrical power for operation, but there are some phases in which they <<generate>> electricity. These phases are short-term, but they can be fairly frequent. At the present time, all the energy generated by actuators is dissipated in the form of heat, which considerably increases their internal temperature.

DETAILED PRESENTATION OF PARTICULAR EMBODIMENTS

Figure 2:
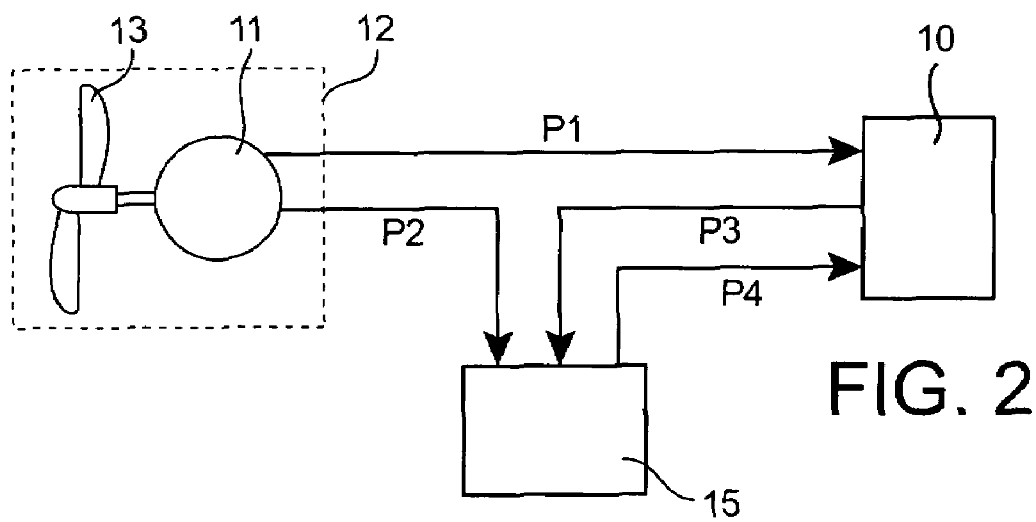
FIG. 2 shows the device according to the invention.

The device according to the invention, as shown in FIG. 2, includes a storage device 15. It combines two source types:

- an energy source, in this case a ram air turbine 12, capable of supplying the average power absorbed by these loads,
- a power source, in this case a storage element 15, capable of supplying the peak powers absorbed by fluctuating loads.

FIG. 2 shows:

- a power P1 circulating from the energy source 12 to consumers (loads 10). This power is equal to the average power absorbed by the loads,
- a power P2 stored in the storage element 15,
- possibly a power P3 recovered from some consumers (consumers with reversible power). This power P3 is in the form of short-term peaks,
- a power P4 restored to consumers (loads 10) through the storage element 15. This power is very fluctuating, and can reach high values during short periods which is why they are called peaks.

In the remainder of this description, the energy source considered as an example is a ram air turbine. It acts as an energy source because it is capable of outputting at least the average power required during a period corresponding to the complete flight mission in emergency mode.

Such an energy source could also be an APU type unit running on kerosene or hydrazine driving an electric generator, or a fuel cell, etc.

The power source is generated from a storage element 15, for example accumulator batteries, supercapacitors, a flywheel, or a combination of several such storage elements (for example batteries-supercapacitors). Such a power source is capable of outputting high powers for short periods during the flight mission in emergency mode.

Such a hybrid architecture can be equally applicable for a DC or AC onboard network. However, depending on the configurations, static converters required at the power and energy sources can be more complex, heavier, larger and expensive for an AC network.

The general principle for management of the charge of the storage element 15 consists of making a highpass filter function by the <<storage element-static conversion chain>> combination, and due to well-designed management (<<software instrumentation-control>>). The storage element should be seen as a power filter. The load absorbs a highly fluctuating power with time. Therefore the frequency spectrum of the power is very rich in low, medium and high frequency harmonics. Therefore the filtering principle consists of separating the frequency spectrum into two; very low frequencies (approximately equal to the average power value) that pass through the turbine 12, and higher frequencies that pass through the storage system 15. Over a sufficiently long period, the average power passing through the storage element 15 is zero. This makes it possible to maintain the state of charge of the storage element. Thus, the average storage power is zero over a period not much longer than the inverse of the chosen filter frequency. Therefore, this type of filter method can filter consumption peaks without needing to be concerned with the state of charge of the storage element, in average value.

In practice, the storage element 15, assumed to be initially charged, discharges during power peaks consumed by the load 10. Between these peaks, the storage element is recharged by collecting energy necessary for the turbine 12 that outputs the average power consumed and losses.

Unlike a turbine alone, the hybrid structure of the device according to the invention is reversible in power. Therefore it is possible to recover energy from the onboard network to the storage element 15. It is sufficient to exploit the reversibility of power for some loads, and particularly actuators. But this is only possible with actuators designed to take advantage of this reversibility, and is therefore preferably applicable to the case of a high DC voltage onboard network.

Figure 1:
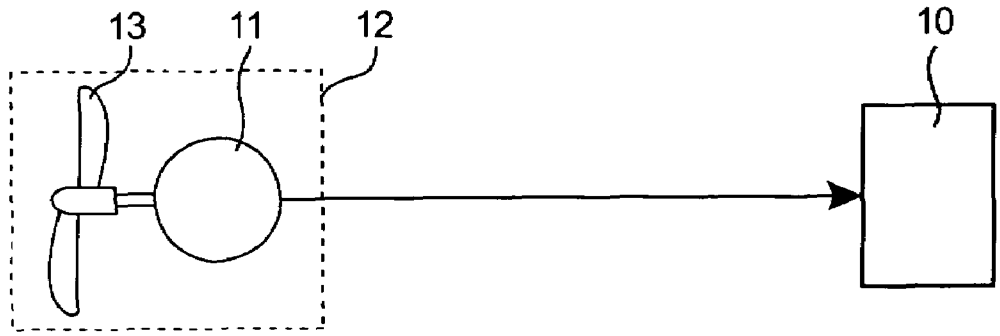
FIG. 1 shows a device according to prior art.

In the device according to prior art shown in FIG. 1, the turbine 12 imposes the onboard network voltage. In maintaining this principle, the turbine 12 maintains its voltage source properties in the structure with the storage element 15 of the device according to the invention as shown in FIG. 2. Therefore the storage element 15 acts like a current source, imposing a current that varies as a function of the power peaks to be output.

Figure 3:
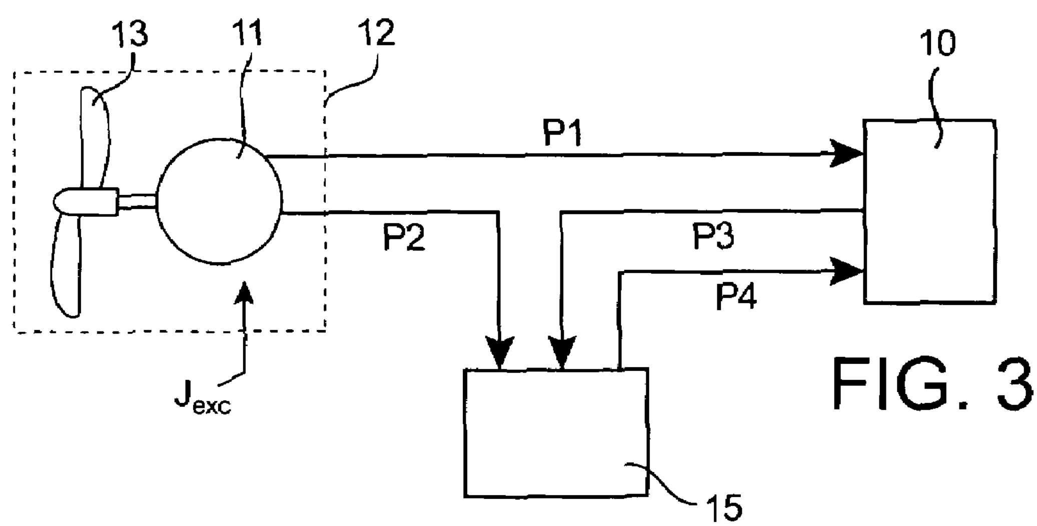
FIG. 3 shows a variant of the device according to the invention.

Nevertheless in one variant embodiment, it is possible to invert source properties by requesting the storage element 15 to impose the onboard network voltage and the turbine to impose its slowly varying current, as shown in FIG. 3. The power transfers shown in FIG. 2 are maintained. On the other hand, this releases a degree of freedom on the generator 11 of the turbine 12, namely the excitation current Jexc, previously adjusted to regulate the network voltage. Since this voltage must no longer be imposed by the turbine, the adjustment of the excitation current Jexc provides a means of reaching the optimum operation point on the torque-speed characteristic of the turbine 12. It is then possible to perform an optimisation function of the power output by the turbine 12 (Maximum Power Point Tracking (MPPT) strategy). Energy management considered for the system according to the invention as shown in FIG. 2 can still be used in the variant shown in FIG. 3. The added value due to this inversion of source types is optimisation of the energy recovered by the turbine 12, so as to reduce the size of the turbine.

The invention claimed is:

1. An electrical emergency source device fitted on an aircraft for outputting power to a first plurality of loads that absorb a constant power with time, and to a second plurality of loads that absorb variable power with time, said device comprising:

- an energy source sized to output the average power absorbed by said first and second pluralities of loads,
- a power source that supplies power peaks absorbed by the second plurality of loads,
- wherein said energy source has a first output that supplies power to said first and second plurality of loads and a second output that supplies power to said power source, and
- wherein said power source has a first input that receives power from said energy source, a second input that receives power that has been absorbed by the loads and then output from the loads back into the electrical source device, when a power demand from the loads has decreased, and an output that supplies power to said second plurality of loads,
- wherein said second plurality of loads include flight control actuators for said aircraft, said flight control actuators having reversible power, said second input of said power source being configured and connected to said flight control actuators so as to receive power from said flight control actuators during phases when said flight control actuators generate electricity, and wherein the power source acts as a power filter such that low frequencies of the power pass through the energy source and high frequencies of the power pass through the power source.

2. A device according to claim 1, wherein said energy source and said power source are connected to an aircraft onboard network that is a DC high voltage network.

3. A device according to claim 1, wherein the energy source is a ram air turbine.

4. A device according to claim 1, wherein the energy source is an auxiliary power unit.

5. A device according to claim 1, wherein the energy source is a fuel cell.

6. A device according to claim 1, wherein the power source is a storage element.

7. A device according to claim 6, wherein said storage element comprises accumulator batteries.

8. A device according to claim 6, wherein said storage element comprises supercapacitors.

9. A device according to claim 6, wherein said storage element comprises a flywheel.

10. A device according to claim 1, wherein the energy source is a ram air turbine that imposes its voltage on the onboard network.

11. A device according to claim 6, wherein said storage element imposes its voltage on an aircraft onboard network connected to said energy source and said power source.

12. A device according to claim 1, wherein the aircraft is an airplane.

13. A device according to claim 1, wherein said power source discharges power to said second plurality of loads during said power peaks, and said power source recharges between said power peaks.

14. A device according to claim 1, wherein a time-averaged power passing through said power source is zero.

15. A device according to claim 1, wherein said second plurality of loads include flight control actuators for said aircraft, said second input of said power source being configured and connected to said flight control actuators so as to receive power from said flight control actuators during phases when said flight control actuators generate electricity.

* * * * *

UNITED STATES PATENT AND TRADEMARK OFFICE

CERTIFICATE OF CORRECTION

PATENT NO. : 7,692,331 B2
APPLICATION NO. : 11/404077
DATED : April 6, 2010
INVENTOR(S) : Langlois et al.

It is certified that error appears in the above-identified patent and that said Letters Patent is hereby corrected as shown below:

On the title page, Item (73), the Assignees' information is incorrect. Item (73) should read:

-- (73) Assignee: Airbus France, Toulouse (FR); Centre National de la Recherche Scientifique, Paris (FR); Institut National Polytechnique de Toulouse, Toulouse (FR) --

Signed and Sealed this

Fifteenth Day of June, 2010

David J. Kappos
*Director of the United States Patent and Trademark Office*